United States Patent Office 3,304,055
Patented Feb. 14, 1967

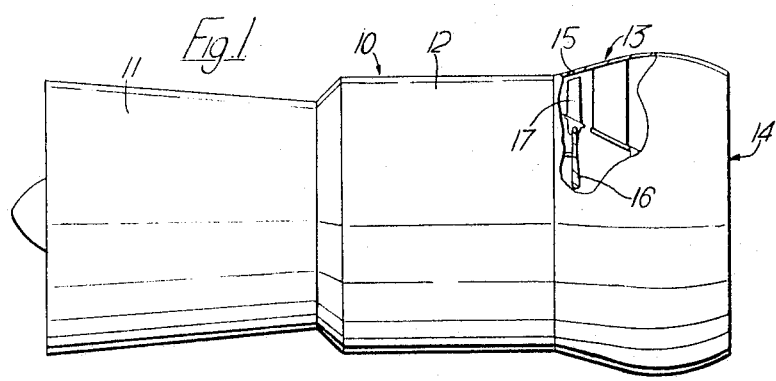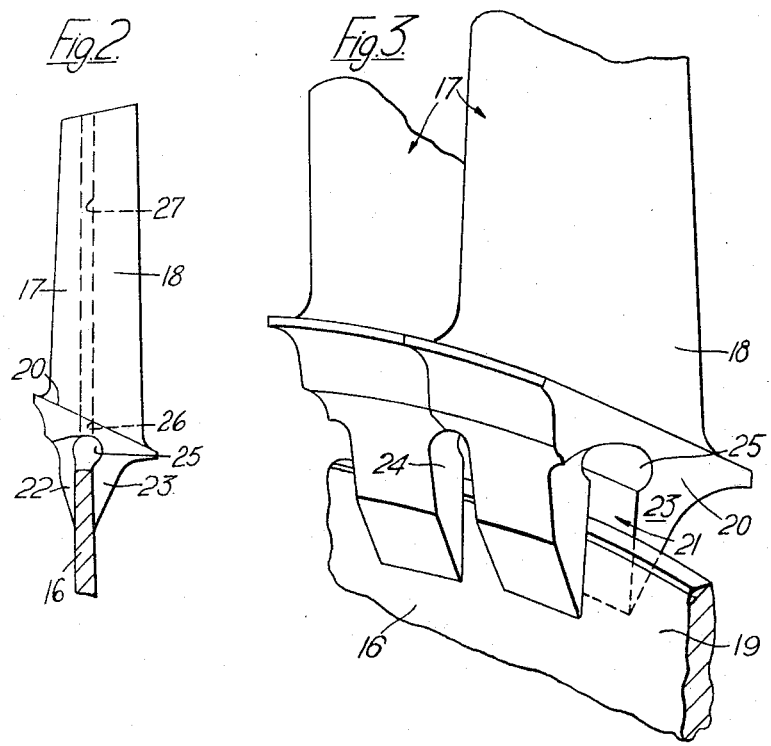

3,304,055
ROTOR
Jack Britt, Ambergate, England, assignor to Rolls-Royce Limited, Derby, England, a company of Great Britain
Filed Aug. 19, 1965, Ser. No. 480,984
Claims priority, application Great Britain, Mar. 3, 1965, 9,171/65
2 Claims. (Cl. 253—39.15)

This invention relates to a rotor and an axial fluid flow machine provided therewith.

According to the present invention there is provided a rotor for an axial fluid flow machine comprising a rotor disc supporting a plurality of radially extending blades, the radially inner end of each blade being provided with a slot within which the periphery of the disc is disposed.

By providing the blades with slots and disposing the periphery of the disc therein, the blades may be fixed to the disc by a relatively light-weight connection compared with mechanical joints which are normally provided. Thus, in turbine design, "fir tree" joints and like mechanical joints are relatively heavy and, by employing the present arrangement a metallurgical joint may be provided between the blade and disc to reduce the weight of the assembly by up to 50%.

Preferably the periphery of the disc does not extend for the full radial depth of said slot whereby an annular cooling air channel is defined between the periphery of the disc and the slots in said blades. In a preferred embodiment each slot is defined between upstream and downstream wall members, the downstream wall members of adjacent blades abutting to seal said cooling air channel and the upstream wall members of adjacent blades defining therebetween axial flow apertures or slots which lead cooling air into said cooling air channel.

Ports may be provided in the roots of the blades by which cooling air may leave the channel. Alternatively, the cooling air channel may communicate with cooling air ducts within the blades.

Preferably the portions of said blades between which the disc is disposed are chamfered. The blades may be fixed to the disc by diffusion bonding, welding or brazing or similar metallurgical methods.

The invention also includes an axial fluid flow machine provided with a rotor as set forth above. Thus the fluid flow machine may be an axial flow gas turbine jet propulsion engine provided with a turbine the rotor of which is constructed as set forth above.

The invention is illustrated, merely by way of example, in the accompanying drawings, in which:

FIGURE 1 is a cut-way view of a gas turbine jet propulsion engine provided with a rotor in accordance with the present invention, FIGURE 2 is an enlarged part-sectional elevation of part of the engine shown in FIGURE 1, and FIGURE 3 is a perspect view of part of the engine shown in FIGURE 1, to a larger scale.

Referring to the drawings there is shown a gas turbine jet propulsion engine 10 comprising a compressor 11, combustion equipment 12, turbine 13 and jet propulsion nozzle 14. The turbine 13 includes a rotor 15 comprising a rotor disc 16 and a plurality of radially disposed blades 17 provided about the periphery thereof.

As seen more clearly in FIGURES 2 and 3, each blade comprises a working portion 18 and a root portion 20. Root portions 20 are slotted to provide slots 21 within which the periphery 19 of disc 16 is disposed. The slots 21 are defined between upstream and downstream wall members 22, 23 respectively.

Upstream wall members 22 are so formed that parts thereof are spaced apart to provide axial flow apertures or slots 24 therebetween. The apertures 24 communicate with an annular cooling air channel 25 defined between the periphery 19 of disc 16 and the root portion 20 of the blades 17, the disc 16 not extending for the full radial depth of the slots 21.

The root portions 20 of adjacent blades 17 abut one another. Thus wall members 23 and the remainder of root portions 20 seal the annular cooling air channel 25, the apertures 24 leading air thereto.

Ports 26 are provided to lead the cooling air away from the channel 25. These ports may either exhaust the cooling air directly into the gas stream through the engine or may direct the cooling air through radially extending cooling air ducts 27 within the working portions 18 of blades 17.

During manufacture, the wall members 22, 23 are diffusion bonded, welded or brazed to the periphery 19 of the disc 16 and the bond so effected is then inspected by an ultrasonic or other method after which the wall members 22, 23 are chamfered to the shapes shown in FIGURES 2 and 3.

The radially outer portions of cooling air channel 25 will be seen to be generally oval. It will be appreciated that such a shape is preferable to sharp corners (e.g. if the channel 21 were of rectangular form) since stresses are reduced with the continuously curved section.

A suitable material for the disc 16 is, for example, 18% nickel 300 grade maraging steel.

It has been found that a metallurgical joint of the type described above can effect a 50% saving in weight on the rotor assembly compared with conventional mechanical joints between blades and disc e.g. of the fir tree root type. With relatively light-weight lift engines such, for example, as the type which employs synthetic resin material for the compressor of the engine, this saving in weight could constitute approximately 10% of the total weight of the engine, and is therefore a serious consideration in the design of the engine.

Although the invention has been particularly described with reference to its use in the turbine rotor stage of a gas turbine engine, it will be appreciated that the arrangement can be used on any rotor for use in an axial fluid flow machine. Thus, the arrangement may be used on an axial flow compressor rotor. Where the compressor rotor is of synthetic resin material, the metallurgical joint will be formed with a resin bond or glue of a suitable nature.

I claim:

1. A rotor for an axial fluid flow machine comprising a rotor disc, a plurality of radially extending blades which are bonded to said disc, said blades having root portions abutting one another, upstream and downstream wall members at the radially inner end of each blade defining therebetween a slot within which the periphery of the disc is disposed, the periphery of said disc extending for less than the full radial depth of said slot to thereby define an annular cooling air channel between the periphery of the disc and the slots in said blades, the downstream wall members of adjacent blades abutting to seal said cooling air channel and the upstream wall members of adjacent blades defining therebetween axial flow apertures which lead cooling air into said cooling air channel, said root portions of the blades having ports therein communicating with said channel and by which the cooling air may leave said channel.

2. A rotor as claimed in claim 1 in which each of said blades has cooling air ducts therein, said cooling air channel communicating with the cooling air ducts within said blades.

References Cited by the Examiner

UNITED STATES PATENTS

| | | | |
|---|---|---|---|
| 1,904,421 | 4/1933 | Doran | 253—77 |
| 2,625,366 | 1/1953 | Williams | 253—39.15 |
| 2,857,132 | 10/1958 | McDowall | 253—39.15 |
| 3,042,369 | 7/1962 | Welsh | 253—77 |

FOREIGN PATENTS

| | | |
|---|---|---|
| 514,798 | 7/1955 | Canada. |
| 853,680 | 10/1952 | Germany. |

MARTIN P. SCHWADRON, *Primary Examiner.*

EVERETTE A. POWELL, JR., *Examiner.*